(12) United States Patent
Chen

(10) Patent No.: US 8,961,718 B2
(45) Date of Patent: Feb. 24, 2015

(54) APPARATUS AND METHOD FOR LAMINATING ANISOTROPIC CONDUCTIVE FILM ON FLAT DISPLAY PANEL

(71) Applicant: Shenzhen China Star Optoelectronics Technology Co., Ltd., Shenzhen, Guangdong (CN)

(72) Inventor: Fangfu Chen, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/235,069

(22) PCT Filed: Jun. 28, 2013

(86) PCT No.: PCT/CN2013/078244
§ 371 (c)(1),
(2) Date: Jan. 26, 2014

(87) PCT Pub. No.: WO2014/180050
PCT Pub. Date: Nov. 13, 2014

(65) Prior Publication Data
US 2014/0332140 A1 Nov. 13, 2014

(30) Foreign Application Priority Data
May 8, 2013 (CN) .......................... 2013 1 0166681

(51) Int. Cl.
*B32B 37/00* (2006.01)
*B32B 38/00* (2006.01)
(52) U.S. Cl.
CPC ....... *B32B 38/0004* (2013.01); *B32B 2307/202* (2013.01); *B32B 2307/706* (2013.01); *B32B 2457/206* (2013.01)

USPC ......... 156/73.3; 156/73.1; 156/250; 156/510; 156/580.2

(58) Field of Classification Search
USPC .......... 156/73.1, 73.3, 250, 510, 580.1, 580.2
See application file for complete search history.

(56) References Cited

U.S. PATENT DOCUMENTS 4,752,351 A * 6/1988 Lunt .......................... 156/580.1
5,985,065 A * 11/1999 Kling ........................... 156/73.3
(Continued)

FOREIGN PATENT DOCUMENTS

CN  101146682 A  3/2008
CN  101856901 A  10/2010
(Continued)

*Primary Examiner* — James Sells
(74) *Attorney, Agent, or Firm* — Andrew C. Cheng

(57) ABSTRACT

The present invention provides an apparatus and a method for laminating an anisotropic conductive film on a flat display panel. The apparatus includes: a feeding device, a cutting device, a pressing device, and a collection device. The feeding device supplies an anisotropic conductive film. The anisotropic conductive film includes a film body and a release sheet laminated on the film body. The cutting device includes an ultrasonic cutter, which is arranged under the feeding device to cut off the film body of the anisotropic conductive film passing therethrough. The pressing device is arranged at one side of the cutting device to attach the film body of the anisotropic conductive film that has been cut off and is ready to laminate to the flat display panel. The collection device is arranged at one side of the pressing device that is away from the cutting device to collect the release sheet of the anisotropic conductive film. The present invention uses an ultrasonic cutter to cut off the anisotropic conductive film in a non-contact manner so as to provide high cutting preciseness and effectively eliminate the occurrence of poor lamination of the anisotropic conductive film resulting from blunting of cutter and attaching of residual adhesive of the anisotropic conductive film to the cutter.

11 Claims, 4 Drawing Sheets

(56) References Cited

U.S. PATENT DOCUMENTS 6,749,102 B2 * 6/2004 Yamano et al. ............ 228/110.1
6,830,639 B2 * 12/2004 Bleckmann et al. ......... 156/73.3
7,952,785 B2 * 5/2011 Karmhag et al. ............. 359/265

FOREIGN PATENT DOCUMENTS

| CN | 101995677 B | 5/2012 |
| CN | 202640404 U | 1/2013 |
| DE | 4203827 A | 8/1993 |

* cited by examiner

APPARATUS AND METHOD FOR LAMINATING ANISOTROPIC CONDUCTIVE FILM ON FLAT DISPLAY PANEL

BACKGROUND OF THE INVENTION

1. Field of the Invention

The present invention relates to the field of manufacture of flat panel display (FPD), and in particular to an apparatus and a method for laminating an anisotropic conductive film (ACF) on a flat display panel.

2. The Related Arts

A flat panel display has advantages, such as thin device body and reduced power consumption, and is widely used. Flat panel displays that are currently available generally include liquid crystal displays (LCDs) and organic light emitting displays (OLEDs).

The LCDs have a variety of advantages, such as thin device body, low power consumption, and being free of radiation, and are thus widely used. Most of the LCDs that are currently available in the market are backlighting LCDs, which comprise an enclosure, a liquid crystal panel arranged in the enclosure, and a backlight module that is arranged in the enclosure. The operation principle of the liquid crystal panel is that, with liquid crystal molecules interposed between two parallel glass substrates, application of electricity is selectively carried out to control the liquid crystal molecules to change direction in order to refract out light emitting from the backlight module for generating images.

The OLEDs, which show the characteristics of self-illumination, high brightness, wide view angle, high contrast, flexibility, and low energy consumption, attract wide attention for serving as the next-generation display measures that gradually substitute the conventional liquid crystal display devices for applications in mobile phone screens, computer monitors, and full-color television.

During assembling, flat display panels of these flat panel displays require installing a drive IC on a circumferential margin of the flat display panels and connecting devices, such as components, which are formed by using a flexible circuit board to serve as a carrier for a packaged chip for bonding and connecting the chip and the flexible circuit board together, and flexible printed circuits, to the circumferential margin of the flat display panel. Installation and connection of these devices are generally achieved by means of connection with an anisotropic conductive film.

As one of the processes in assembling a flat panel display, attaching an ACF to a flat display panel requires to have the ACF cut first and then laminated to a corresponding site on the flat display panel.

Referring to FIG. 1, which is a schematic view illustrating an apparatus for laminating an ACF, the ACF 100 comprises a film body and a release sheet attached to the film body. The ACF 100 is mounted on a feeding device 300. The ACF 100 is moved sequentially through a cutting device 500 and a pressing device 700 toward a collection device 900. When the ACF 100 passes through the cutting device 500, the cutting device 500 carries out a first cutting operation on the film body of the ACF 100 and when the ACF 100 advances to reach a predetermined location, the cutting device 500 carries out a second cutting operation on the film body of the ACF 100, whereby the two cutting operations cut off the ACF 100 to form an ACF body to be laminated. When the ACF body to be laminated reaches a predetermined operation site of the pressing device 700, the pressing device 700 presses the ACF body to be laminated onto a substrate 750 to complete a lamination process of ACF.

The cutting device that is currently used is generally a stainless cutter driven by a pneumatic cylinder. However, in the mechanical way of cutting an anisotropic conductive film with a stainless steel cutter that is controlled and driven by a pneumatic cylinder, the process of operation thereof suffers impreciseness of cutting, blunting of cutter, attaching of residual adhesive of the anisotropic conductive film to the cutter, leading to the occurrence of poor lamination of the anisotropic conductive film so as to result in an increase of manufacture cost, which is disadvantageous for cost control.

SUMMARY OF THE INVENTION

An object of the present invention is to provide an apparatus for laminating an anisotropic conductive film on a flat display panel, which uses an ultrasonic cutter to cut, in a non-contact manner, an anisotropic conductive film so as to provide high cutting preciseness, effectively ensure quality of cutting, and thus effectively improve quality of lamination.

Another object of the present invention is to provide a method for laminating an anisotropic conductive film on a flat display panel, which uses an ultrasonic cutter to cut, in a non-contact manner, an anisotropic conductive film so as to provide high cutting preciseness, effectively ensure quality of cutting, and thus effectively improve quality of lamination.

To achieve the objects, the present invention provides an apparatus for laminating an anisotropic conductive film on a flat display panel, which comprises: a feeding device, a cutting device, a pressing device, and a collection device. The feeding device supplies an anisotropic conductive film. The anisotropic conductive film comprises a film body and a release sheet laminated on the film body. The cutting device comprises an ultrasonic cutter, which is arranged under the feeding device to cut off the film body of the anisotropic conductive film passing therethrough. The pressing device is arranged at one side of the cutting device to attach the film body of the anisotropic conductive film that has been cut off and is ready to laminate to the flat display panel. The collection device is arranged at one side of the pressing device that is away from the cutting device to collect the release sheet of the anisotropic conductive film.

The feeding device comprises a feeding roller. The cutting device comprises an ultrasonic transducer, a modulator mounted to the ultrasonic transducer, and a cutter mounted to the modulator. The cutter comprises a stem and a cutting edge connected to the stem. The stem is mounted to the modulator. The ultrasonic transducer is electrically connect to external electrical power supply facility to convert electrical energy supplied from the external power supply facility into ultrasonic waves. The modulator adjusts amplitude of the ultrasonic waves and transmits the ultrasonic waves to the cutter. The cutter outputs the ultrasonic waves through the cutting edge to the film body of the anisotropic conductive film, whereby the film body of the anisotropic conductive film is acted upon by energy of the ultrasonic waves and is cut off instantaneously to thereby achieve non-contact cutting of the film body of the anisotropic conductive film.

The present invention also provides a method for laminating an anisotropic conductive film on a flat display panel, which comprises the followings steps:

(1) providing an anisotropic conductive film, a feeding device, a cutting device, a pressing device, and a collection device, wherein the anisotropic conductive film comprises a film body and a release sheet laminated to the film body and the cutting device comprises an ultrasonic cutter;

(2) mounting the anisotropic conductive film to the feeding device to allow the anisotropic conductive film to move sequentially through the cutting device and the pressing device toward the collection device;

(3) operating the cutting device to carry out a first cutting operation on the film body of the anisotropic conductive film that is passing therethrough;

(4) with the anisotropic conductive film moving forward to reach a predetermined location, the cutting device carrying out a second cutting operation on the film body of the anisotropic conductive film that is passing therethrough so that a predetermined size of the film body of the anisotropic conductive film to be laminated is formed through the two cutting operations;

(5) with the film body of the anisotropic conductive film to be laminated moving with the release sheet to reach a predetermined operation location of the pressing device, the pressing device pressing and laminating the film body of the anisotropic conductive film to a flat display panel; and (6) the release sheet of the anisotropic conductive film moving forward to the collection device to be collected thereby.

The feeding device comprises a feeding roller.

The cutting device comprises an ultrasonic transducer, a modulator mounted to the ultrasonic transducer, and a cutter mounted to the modulator.

The cutter comprises a stem and a cutting edge connected to the stem. The stem is mounted to the modulator.

The ultrasonic transducer is electrically connect to external electrical power supply facility to convert electrical energy supplied from the external power supply facility into ultrasonic waves. The modulator adjusts amplitude of the ultrasonic waves and transmits the ultrasonic waves to the cutter. The cutter outputs the ultrasonic waves through the cutting edge to the film body of the anisotropic conductive film, whereby the film body of the anisotropic conductive film is acted upon by energy of the ultrasonic waves and is cut off instantaneously to thereby achieve non-contact cutting of the film body of the anisotropic conductive film.

The pressing device comprises a support table and a thermal pressing head arranged above the support table. The flat display panel is positionable on the support table.

The collection device comprises a vacuum collection barrel and a movable clamping member. The vacuum collection barrel functions to collect the release sheet. The movable clamping member functions to fix or release the release sheet.

The flat display panel comprises a liquid crystal display panel or an organic light-emitting diode display panel.

The present invention further provides a method for laminating an anisotropic conductive film on a flat display panel, which comprises the followings steps:

(1) providing an anisotropic conductive film, a feeding device, a cutting device, a pressing device, and a collection device, wherein the anisotropic conductive film comprises a film body and a release sheet laminated to the film body and the cutting device comprises an ultrasonic cutter;

(2) mounting the anisotropic conductive film to the feeding device to allow the anisotropic conductive film to move sequentially through the cutting device and the pressing device toward the collection device;

(3) operating the cutting device to carry out a first cutting operation on the film body of the anisotropic conductive film that is passing therethrough;

(4) with the anisotropic conductive film moving forward to reach a predetermined location, the cutting device carrying out a second cutting operation on the film body of the anisotropic conductive film that is passing therethrough so that a predetermined size of the film body of the anisotropic conductive film to be laminated is formed through the two cutting operations;

(5) with the film body of the anisotropic conductive film to be laminated moving with the release sheet to reach a predetermined operation location of the pressing device, the pressing device pressing and laminating the film body of the anisotropic conductive film to a flat display panel; and (6) the release sheet of the anisotropic conductive film moving forward to the collection device to be collected thereby;

wherein the feeding device comprises a feeding roller;

wherein the cutting device comprises an ultrasonic transducer, a modulator mounted to the ultrasonic transducer, and a cutter mounted to the modulator;

wherein the cutter comprises a stem and a cutting edge connected to the stem, the stem being mounted to the modulator;

wherein the ultrasonic transducer is adapted to electrically connect to external electrical power supply facility to convert electrical energy supplied from the external power supply facility into ultrasonic waves; the modulator adjusts amplitude of the ultrasonic waves and transmits the ultrasonic waves to the cutter; the cutter outputs the ultrasonic waves through the cutting edge to the film body of the anisotropic conductive film, whereby the film body of the anisotropic conductive film is acted upon by energy of the ultrasonic waves and is cut off instantaneously to thereby achieve non-contact cutting of the film body of the anisotropic conductive film;

wherein the pressing device comprises a support table and a thermal pressing head arranged above the support table, the flat display panel being positionable on the support table;

wherein the collection device comprises a vacuum collection barrel and a movable clamping member, the vacuum collection barrel functioning to collect the release sheet, the movable clamping member functioning to fix or release the release sheet; and wherein the flat display panel comprises a liquid crystal display panel or an organic light-emitting diode display panel.

The efficacy of the present invention is that the present invention provides an apparatus and a method for laminating an anisotropic conductive film on a flat display panel, in which an ultrasonic cutter is used to cut off the anisotropic conductive film in a non-contact manner so as to provide high cutting preciseness and effectively eliminate the occurrence of poor lamination of the anisotropic conductive film resulting from blunting of cutter and attaching of residual adhesive of the anisotropic conductive film to the cutter, whereby quality of flat panel display can be ensured.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
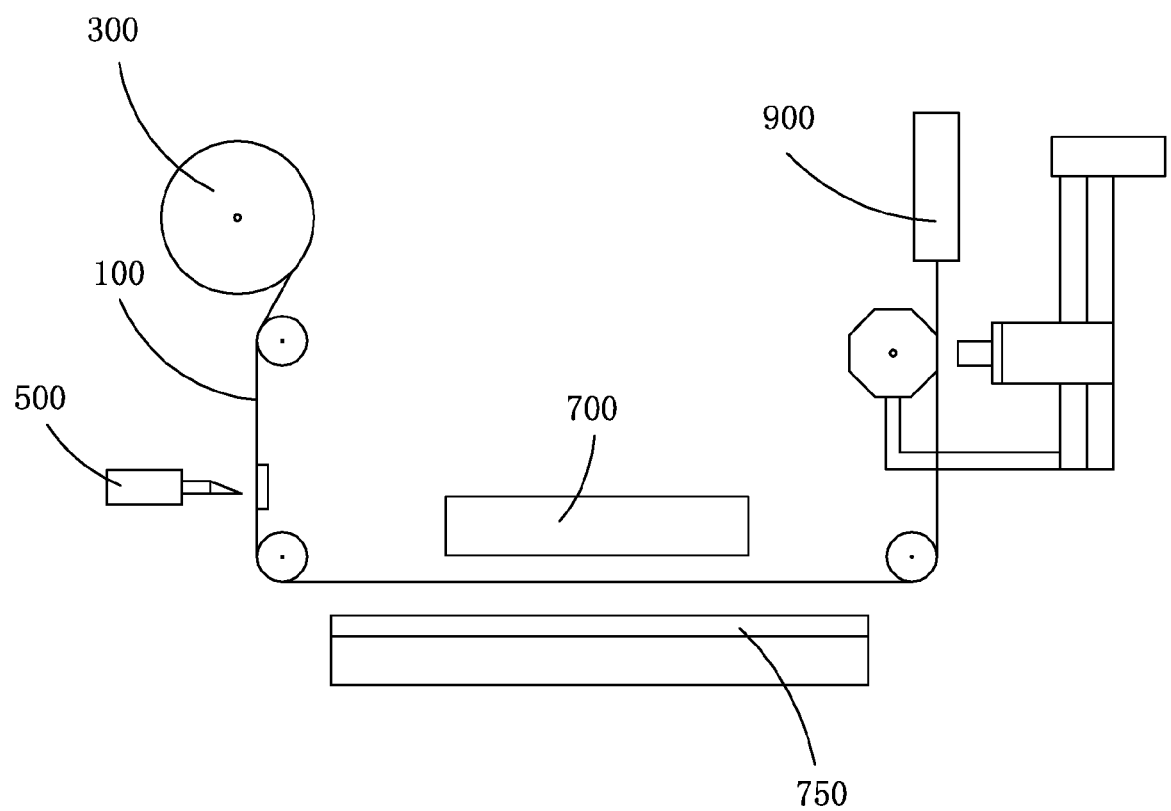
FIG. 1 is a schematic view illustrating the operation principle of a conventional process for laminating an anisotropic conductive film.
Figure 2:
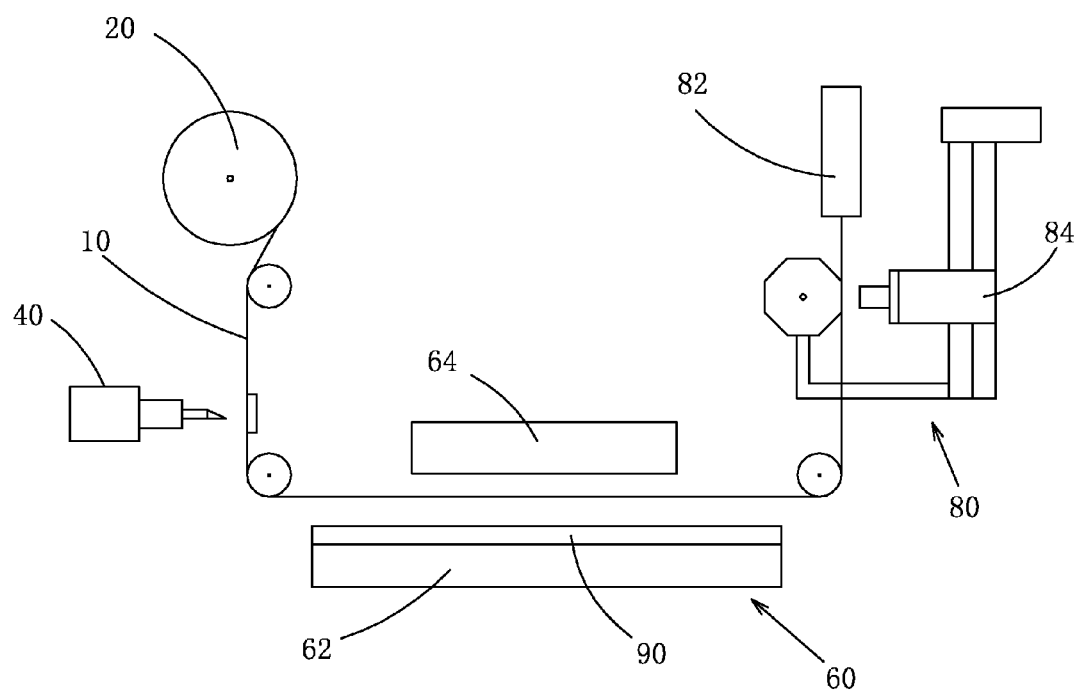
FIG. 2 is a schematic view illustrating the operation principle of an apparatus for laminating an anisotropic conductive film on a flat display panel according to the present invention.
Figure 3:
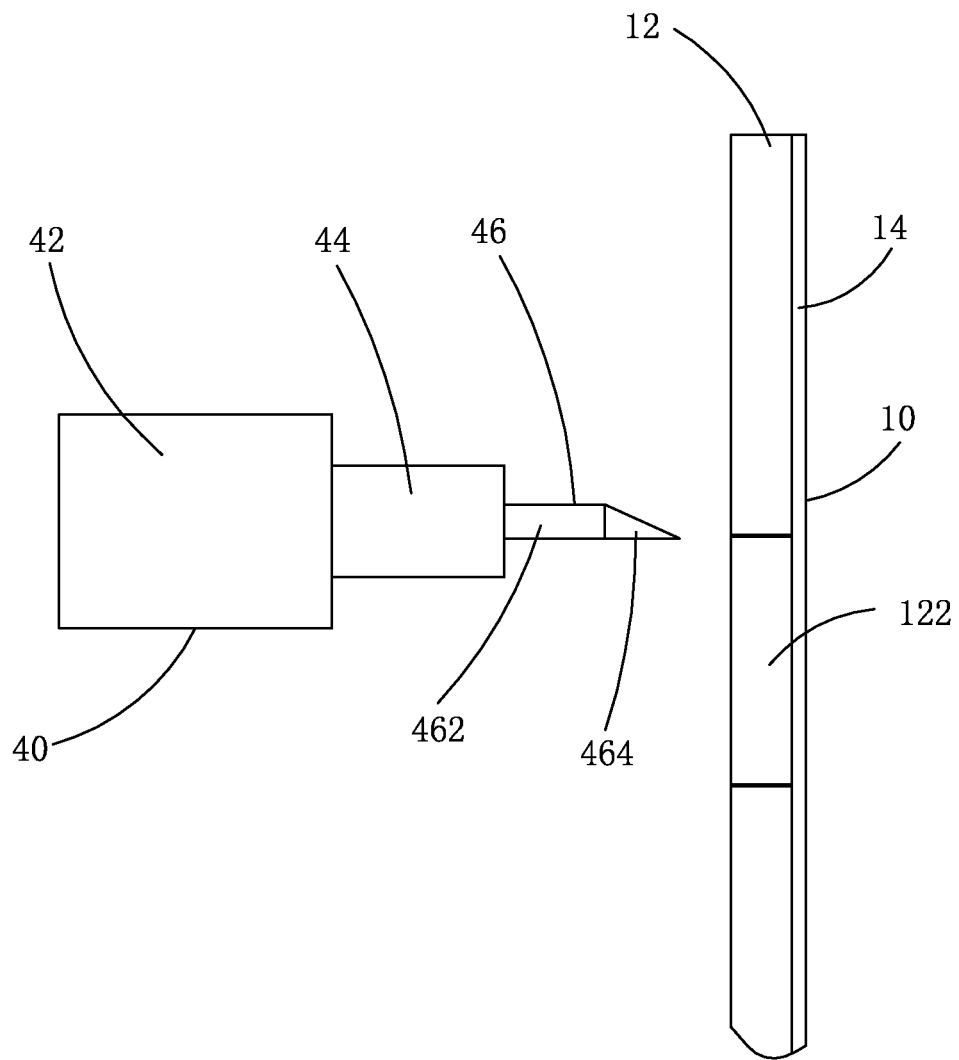
FIG. 3 is a schematic view illustrating a cutting device according to the present invention being applied to cut the anisotropic conductive film.

Referring to FIGS. 2 and 3, the present invention provides an apparatus for laminating an anisotropic conductive film on a flat display panel, which comprises: a feeding device 20, a cutting device 40, a pressing device 60, and a collection device 80.

The feeding device 20 functions to supply an anisotropic conductive film 10. In the instant embodiment, the feeding device 20 comprises a feeding roller.

The anisotropic conductive film 10 comprises a film body 12 and a release sheet 14 laminated on the film body 12.

The cutting device 40 comprises an ultrasonic cutter, which is arranged under the feeding device 20 to cut off the film body 12 of the anisotropic conductive film 10 passing therethrough. The cutting device 40 comprises an ultrasonic transducer 42, a modulator 44 mounted to the ultrasonic transducer 42, and a cutter 46 mounted to the modulator 44. The cutter 46 comprises a stem 462 and a cutting edge 464 connected to the stem 462. The stem 462 is mounted to the modulator 44. Specifically, the ultrasonic transducer 42 converts electrical energy supplied from external power supply facility into ultrasonic waves and transmits the ultrasonic waves to the modulator 44. The modulator 44 adjusts the amplitude of the ultrasonic waves and transmits the ultrasonic waves to the cutter 46. The cutter 46, on the one hand, further amplifies the amplitude and focuses the ultrasonic waves, and, on the other hand, outputs the ultrasonic waves through the cutting edge 464 of the cutter 46 to concentrate and output the ultrasonic energy to the film body 12 of the anisotropic conductive film 10. The film body 12 of the anisotropic conductive film 10 is acted upon by the tremendous ultrasonic energy and is cut off instantaneously to thereby achieve the purposes of cutting of the film body 12 of the anisotropic conductive film 10 in a non-contact manner.

The pressing device 60 is arranged at one side of the cutting device 40 to attach the film body 122 of the anisotropic conductive film that has been cut off and is ready to laminate to the flat display panel 90. Specifically, the pressing device 60 comprises a support table 62 and a thermal pressing head 64 arranged above the support table 62. The flat display panel 90 is positionable on the support table 62. The flat display panel 90 can be a liquid crystal display panel or an organic light-emitting diode display panel.

The collection device 80 is arranged at one side of the pressing device 60 that is away from the cutting device 40 to collect the release sheet 14 of the anisotropic conductive film 10. Specifically, the collection device 80 comprises a vacuum collection barrel 82 and a movable clamping member 84. The vacuum collection barrel 82 functions to collect the release sheet 14 that has been peeled from the film body 12 of the anisotropic conductive film 10. The movable clamping member 84 is operable to fix or release the release sheet 14. When the pressing device 60 presses and laminates the film body 122 of the anisotropic conductive film to be adhered, the movable clamping member 84 fixes the release sheet 14.

Figure 4:
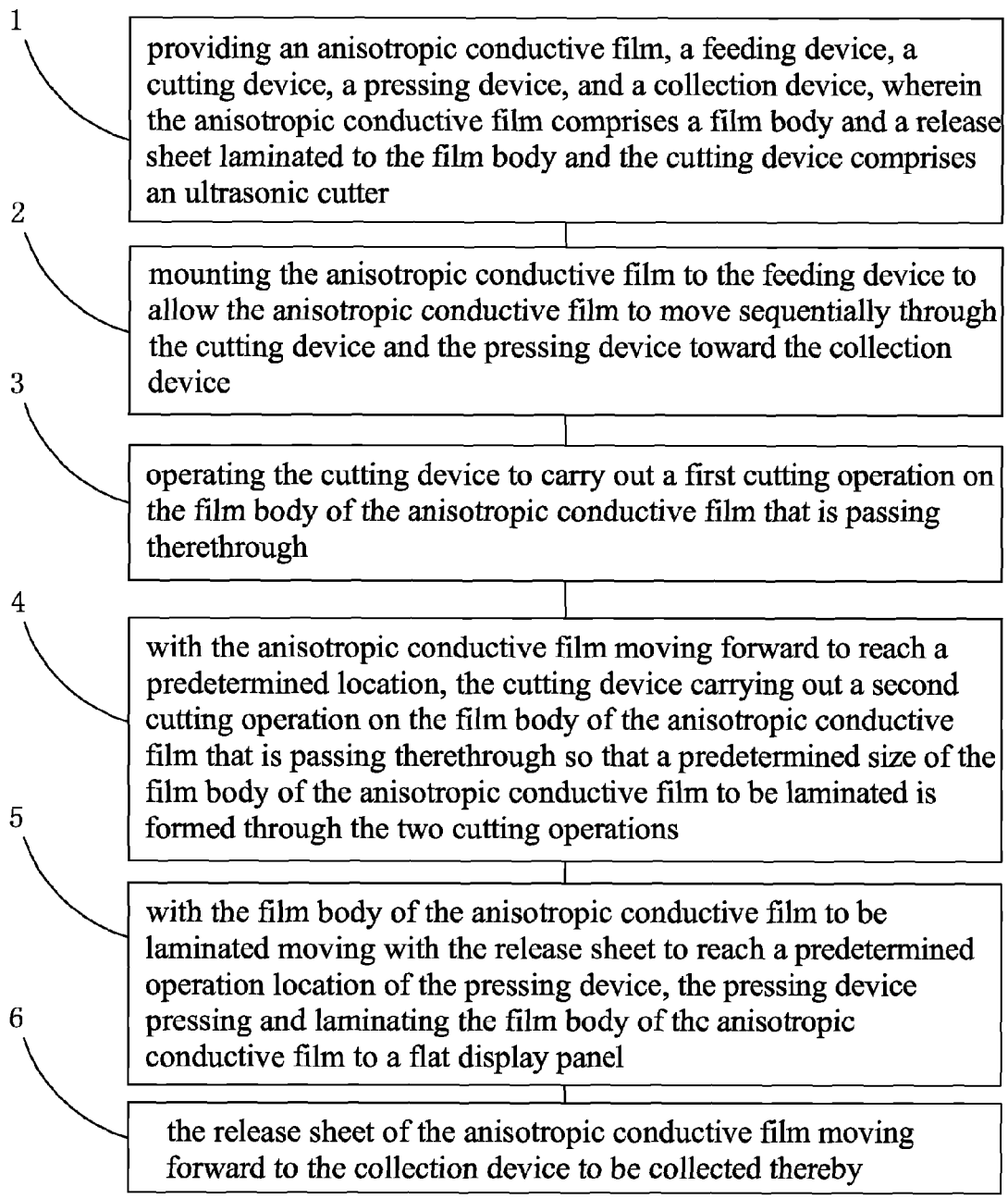
FIG. 4 is a flow chart illustrating a method for laminating an anisotropic conductive film on a flat display panel according to the present invention.

Referring to FIG. 4, with further reference to FIGS. 2 and 3, the present invention also provides a method for laminating an anisotropic conductive film on a flat display panel, which comprises the following steps:

Step 1: providing an anisotropic conductive film 10, a feeding device 20, a cutting device 40, a pressing device 60, and a collection device 80, wherein the anisotropic conductive film 10 comprises a film body 12 and a release sheet 14 laminated to the film body 12 and the cutting device 40 comprises an ultrasonic cutter.

In the instant embodiment, the feeding device 20 comprises a feeding roller and the cutting device 40 comprises an ultrasonic transducer 42, a modulator 44 mounted to the ultrasonic transducer 42, and a cutter 46 mounted to the modulator 44.

The cutter 46 comprises a stem 462 and a cutting edge 464 connected to the stem 462. The stem 462 is mounted to the modulator 44.

Step 2: mounting the anisotropic conductive film 10 to the feeding device 20 to allow the anisotropic conductive film 10 to move sequentially through the cutting device 40 and the pressing device 60 toward the collection device 80.

Step 3: operating the cutting device 40 to carry out a first cutting operation on the film body 12 of the anisotropic conductive film 10 that is passing therethrough.

Specifically, the ultrasonic transducer 42 converts electrical energy supplied from external power supply facility into ultrasonic waves and transmits the ultrasonic waves to the modulator 44. The modulator 44 adjusts the amplitude of the ultrasonic waves and transmits the ultrasonic waves to the cutter 46. The cutter 46, on the one hand, further amplifies the amplitude and focuses the ultrasonic waves, and, on the other hand, outputs the ultrasonic waves through the cutting edge 464 of the cutter 46 to concentrate and output the ultrasonic energy to the film body 12 of the anisotropic conductive film 10. The film body 12 of the anisotropic conductive film 10 is acted upon by the tremendous ultrasonic energy and is cut off instantaneously to thereby achieve the purposes of cutting of the film body 12 of the anisotropic conductive film 10 in a non-contact manner.

Step 4: with the anisotropic conductive film 10 moving forward to reach a predetermined location, the cutting device carrying out a second cutting operation on the film body 12 of the anisotropic conductive film 10 that is passing therethrough so that a predetermined size of the film body 122 of the anisotropic conductive film to be laminated is formed through the two cutting operations.

Step 5: with the film body 122 of the anisotropic conductive film to be laminated moving with the release sheet 14 to reach a predetermined operation location of the pressing device 60, the pressing device 60 pressing and laminating the film body 122 of the anisotropic conductive film to the flat display panel 90.

The pressing device 60 comprises a support table 62 and a thermal pressing head 64 arranged above the support table 62. The flat display panel 90 is positionable on the support table 62. The flat display panel 90 can be a liquid crystal display panel or an organic light-emitting diode display panel.

Step 6: the release sheet 14 of the anisotropic conductive film 10 moving forward to the collection device 80 to be collected thereby.

The collection device 80 comprises a vacuum collection barrel 82 and a movable clamping member 84. The vacuum collection barrel 82 functions to collect the release sheet 14 that has been peeled from the film body 12 of the anisotropic conductive film 10. The movable clamping member 84 is operable to fix or release the release sheet 14. When the pressing device 60 presses and laminates the film body 122 of the anisotropic conductive film to be adhered, the movable clamping member 84 fixes the release sheet 14.

In summary, the present invention provides an apparatus and a method for laminating an anisotropic conductive film on a flat display panel, in which an ultrasonic cutter is used to cut off the anisotropic conductive film in a non-contact manner so as to provide high cutting preciseness and effectively eliminate the occurrence of poor lamination of the anisotropic conductive film resulting from blunting of cutter and attaching of residual adhesive of the anisotropic conductive film to the cutter, whereby quality of flat panel display can be ensured.

Based on the description given above, those having ordinary skills of the art may easily contemplate various changes and modifications of the technical solution and technical ideas of the present invention and all these changes and modifications are considered within the protection scope of right for the present invention.

What is claimed is:

1. An apparatus for laminating an anisotropic conductive film on a flat display panel, comprising: a feeding device, a cutting device, a pressing device, and a collection device, the feeding device supplying an anisotropic conductive film, the anisotropic conductive film comprising a film body and a release sheet laminated on the film body, the cutting device comprising an ultrasonic cutter, which is arranged under the feeding device to cut off the film body of the anisotropic conductive film passing therethrough, the pressing device being arranged at one side of the cutting device to attach the film body of the anisotropic conductive film that has been cut off and is ready to laminate to the flat display panel, the collection device being arranged at one side of the pressing device that is away from the cutting device to collect the release sheet of the anisotropic conductive film.

2. The apparatus for laminating an anisotropic conductive film on a flat display panel as claimed in claim 1, wherein the feeding device comprises a feeding roller; the cutting device comprises an ultrasonic transducer, a modulator mounted to the ultrasonic transducer, and a cutter mounted to the modulator; the cutter comprises a stem and a cutting edge connected to the stem, the stem being mounted to the modulator; the ultrasonic transducer is adapted to electrically connect to external electrical power supply facility to convert electrical energy supplied from the external power supply facility into ultrasonic waves; the modulator adjusts amplitude of the ultrasonic waves and transmits the ultrasonic waves to the cutter; the cutter outputs the ultrasonic waves through the cutting edge to the film body of the anisotropic conductive film, whereby the film body of the anisotropic conductive film is acted upon by energy of the ultrasonic waves and is cut off instantaneously to thereby achieve non-contact cutting of the film body of the anisotropic conductive film.

3. A method for laminating an anisotropic conductive film on a flat display panel, comprising the followings steps:
(1) providing an anisotropic conductive film, a feeding device, a cutting device, a pressing device, and a collection device, wherein the anisotropic conductive film comprises a film body and a release sheet laminated to the film body and the cutting device comprises an ultrasonic cutter;
(2) mounting the anisotropic conductive film to the feeding device to allow the anisotropic conductive film to move sequentially through the cutting device and the pressing device toward the collection device;
(3) operating the cutting device to carry out a first cutting operation on the film body of the anisotropic conductive film that is passing therethrough;
(4) with the anisotropic conductive film moving forward to reach a predetermined location, the cutting device carrying out a second cutting operation on the film body of the anisotropic conductive film that is passing therethrough so that a predetermined size of the film body of the anisotropic conductive film to be laminated is formed through the two cutting operations;
(5) with the film body of the anisotropic conductive film to be laminated moving with the release sheet to reach a predetermined operation location of the pressing device, the pressing device pressing and laminating the film body of the anisotropic conductive film to a flat display panel; and
(6) the release sheet of the anisotropic conductive film moving forward to the collection device to be collected thereby.

4. The method for laminating an anisotropic conductive film on a flat display panel as claimed in claim 3, wherein the feeding device comprises a feeding roller.

5. The method for laminating an anisotropic conductive film on a flat display panel as claimed in claim 3, wherein the cutting device comprises an ultrasonic transducer, a modulator mounted to the ultrasonic transducer, and a cutter mounted to the modulator.

6. The method for laminating an anisotropic conductive film on a flat display panel as claimed in claim 5, wherein the cutter comprises a stem and a cutting edge connected to the stem, the stem being mounted to the modulator.

7. The method for laminating an anisotropic conductive film on a flat display panel as claimed in claim 6, wherein the ultrasonic transducer is adapted to electrically connect to external electrical power supply facility to convert electrical energy supplied from the external power supply facility into ultrasonic waves; the modulator adjusts amplitude of the ultrasonic waves and transmits the ultrasonic waves to the cutter; the cutter outputs the ultrasonic waves through the cutting edge to the film body of the anisotropic conductive film, whereby the film body of the anisotropic conductive film is acted upon by energy of the ultrasonic waves and is cut off instantaneously to thereby achieve non-contact cutting of the film body of the anisotropic conductive film.

8. The method for laminating an anisotropic conductive film on a flat display panel as claimed in claim 3, wherein the pressing device comprises a support table and a thermal pressing head arranged above the support table, the flat display panel being positionable on the support table.

9. The method for laminating an anisotropic conductive film on a flat display panel as claimed in claim 3, wherein the collection device comprises a vacuum collection barrel and a movable clamping member, the vacuum collection barrel functioning to collect the release sheet, the movable clamping member functioning to fix or release the release sheet.

10. The method for laminating an anisotropic conductive film on a flat display panel as claimed in claim 3, wherein the flat display panel comprises a liquid crystal display panel or an organic light-emitting diode display panel.

11. A method for laminating an anisotropic conductive film on a flat display panel, comprising the followings steps:
(1) providing an anisotropic conductive film, a feeding device, a cutting device, a pressing device, and a collection device, wherein the anisotropic conductive film comprises a film body and a release sheet laminated to the film body and the cutting device comprises an ultrasonic cutter;

(2) mounting the anisotropic conductive film to the feeding device to allow the anisotropic conductive film to move sequentially through the cutting device and the pressing device toward the collection device;

(3) operating the cutting device to carry out a first cutting operation on the film body of the anisotropic conductive film that is passing therethrough;

(4) with the anisotropic conductive film moving forward to reach a predetermined location, the cutting device carrying out a second cutting operation on the film body of the anisotropic conductive film that is passing therethrough so that a predetermined size of the film body of the anisotropic conductive film to be laminated is formed through the two cutting operations;

(5) with the film body of the anisotropic conductive film to be laminated moving with the release sheet to reach a predetermined operation location of the pressing device, the pressing device pressing and laminating the film body of the anisotropic conductive film to a flat display panel; and (6) the release sheet of the anisotropic conductive film moving forward to the collection device to be collected thereby; and wherein the feeding device comprises a feeding roller;

wherein the cutting device comprises an ultrasonic transducer, a modulator mounted to the ultrasonic transducer, and a cutter mounted to the modulator;

wherein the cutter comprises a stem and a cutting edge connected to the stem, the stem being mounted to the modulator;

wherein the ultrasonic transducer is adapted to electrically connect to external electrical power supply facility to convert electrical energy supplied from the external power supply facility into ultrasonic waves; the modulator adjusts amplitude of the ultrasonic waves and transmits the ultrasonic waves to the cutter; the cutter outputs the ultrasonic waves through the cutting edge to the film body of the anisotropic conductive film, whereby the film body of the anisotropic conductive film is acted upon by energy of the ultrasonic waves and is cut off instantaneously to thereby achieve non-contact cutting of the film body of the anisotropic conductive film;

wherein the pressing device comprises a support table and a thermal pressing head arranged above the support table, the flat display panel being positionable on the support table;

wherein the collection device comprises a vacuum collection barrel and a movable clamping member, the vacuum collection barrel functioning to collect the release sheet, the movable clamping member functioning to fix or release the release sheet; and wherein the flat display panel comprises a liquid crystal display panel or an organic light-emitting diode display panel.

* * * * *